United States Patent [19]
Clyburn, III et al.

[11] Patent Number: 5,649,041
[45] Date of Patent: Jul. 15, 1997

[54] CABLE UTILIZING WETTED SUPERABSORBENT POWDER OR WATER SOLUBLE ADHESIVE

[75] Inventors: Clinton E. Clyburn, III; Anne G. Bringuier, both of Taylorsville, N.C.

[73] Assignee: Siecor Corporation, Hickory, N.C.

[21] Appl. No.: 556,357

[22] Filed: Nov. 13, 1995

[51] Int. Cl.⁶ ................................................ G02B 6/44
[52] U.S. Cl. ................................................ 385/109
[58] Field of Search ................................ 385/100–109, 385/147

[56] References Cited

U.S. PATENT DOCUMENTS

| | | | |
|---|---|---|---|
| 4,401,366 | 8/1983 | Hope | 385/100 |
| 4,419,157 | 12/1983 | Ferrentino | 156/56 |
| 4,512,827 | 4/1985 | Gill | 156/48 |
| 4,743,238 | 5/1988 | Colon et al. | 604/361 |
| 4,913,517 | 4/1990 | Arroyo et al. | 385/100 |
| 5,010,209 | 4/1991 | Marciano-Agostinelli et al. | 174/23 C |
| 5,321,788 | 6/1994 | Arroyo et al. | 385/109 |
| 5,388,175 | 2/1995 | Clarke | 385/100 |
| 5,389,442 | 2/1995 | Arroyo et al. | 428/396 |

FOREIGN PATENT DOCUMENTS

| | | |
|---|---|---|
| 2711011 | 4/1985 | France . |
| 2711011 | 4/1995 | France . |

*Primary Examiner*—Akm Ullah
*Attorney, Agent, or Firm*—J. David Abernethy

[57] ABSTRACT

A telecommunication cable includes a layer comprising wetted water-absorptive powder on the surface of a substrate element, thereby avoiding the use of adhesives to bind the dry superabsorbent powder. The water-absorptive powder may be adhered to the surface of the substrate element by a water-soluble adhesive material.

13 Claims, 4 Drawing Sheets

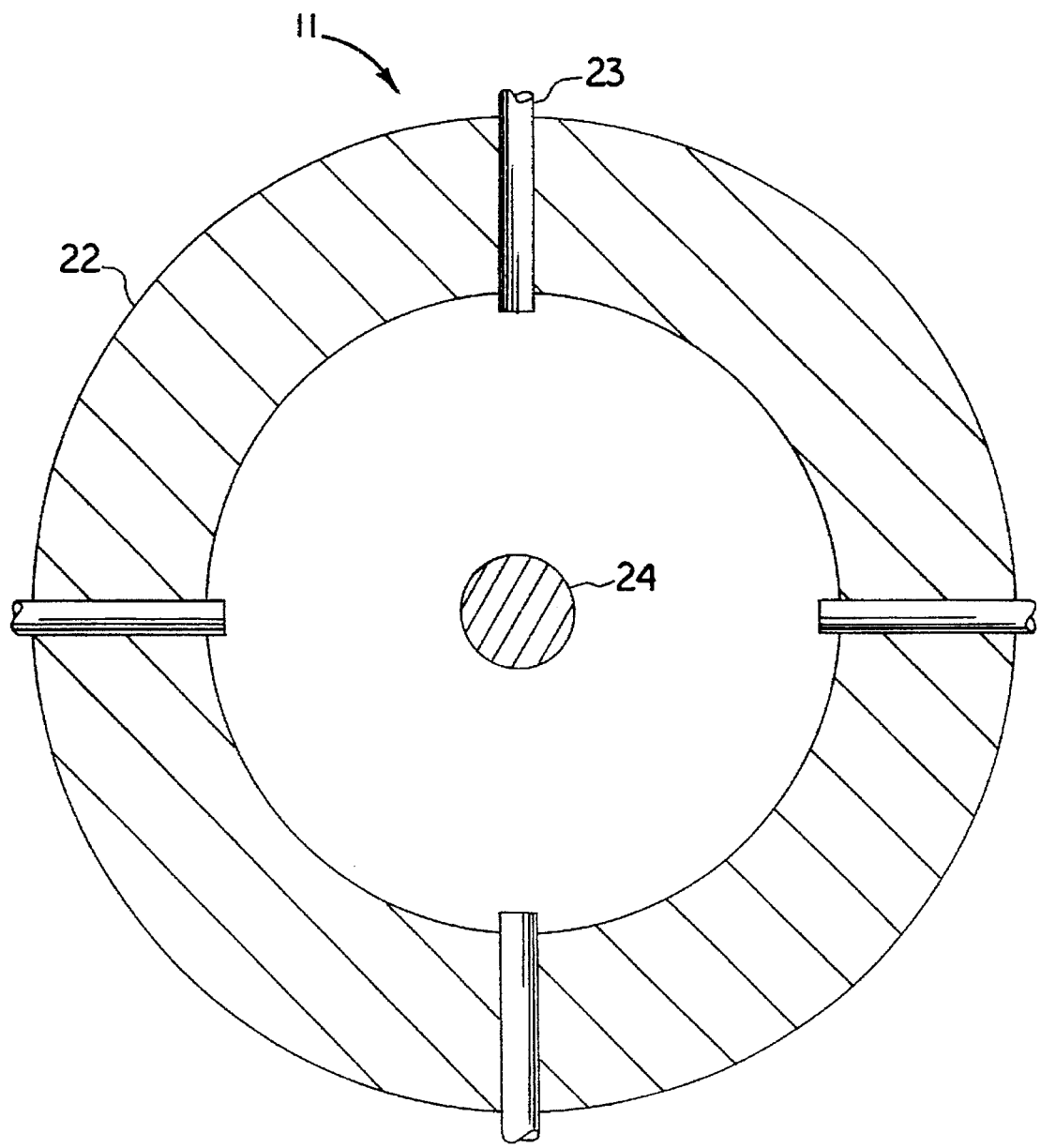

CABLE UTILIZING WETTED SUPERABSORBENT POWDER OR WATER SOLUBLE ADHESIVE

BACKGROUND OF THE INVENTION

The field of the invention is cables for use in environments exposed to moisture which nonetheless contain telecommunication elements which must be protected against moisture.

Longitudinally extending telecommunication elements in telecommunication cables include both electrical conductors and optical waveguides. It is well known that both such telecommunication elements must be protected against contact with moisture. Moisture can cause electrical shorts in electrical conductors and can cause bending in optical waveguide fibers, especially when water freezes, resulting in increased attenuation of such optical fibers.

Moisture can enter a cable due to differences in vapor pressure between a cable interior and its external environment and condense within the interior due to temperature cycling.

Water may enter a cable due to damage to the cable outer jacket due to rodent activity or other mechanical breaks or tears. Upon entry, water may then migrate longitudinally along the cable.

Various methods have been used to protect telecommunications cables from the deleterious effects of moisture when moisture enters the cable or spreads longitudinally through the cable. Various oil or grease based compounds have been used to block the spread of moisture in the cables. However, a disadvantage of such compounds is that they are rather messy when workers must enter or reenter a cable to split off or connectorize individual telecommunication elements in a multiconductor cable.

By way of example, U.S. Pat. No. 4,512,827 teaches an electric cable which includes powdered electrical insulating material mixed with a small quantity of liquid hydrophobic material.

Another method of protecting a cable from moisture is the use of a sealed metallic shield inside the cable jacket. Disadvantages of such shields are various problems encountered in completely sealing the seams, the low processing line speeds necessary to form and seal such seams, and the introduction of metallic elements into what otherwise may well be an all-dielectric cable.

Another method used to protect telecommunication cables from the effects of moisture is to introduce into the cables powders which expand to many times their initial size upon contact with water, such powders sometimes called superabsorbent powders. Two such superabsorbent powder materials are cellulosic or starch-graft copolymers and synthetic materials. Synthetic materials include polyelectrolytes and nonelectrolytes. Polyelectrolyte superabsorbent materials include polymaleic anhydride-vinyl, polyacrylonitrile-based materials, polyacrylic acids, and polyvinyl alcohols. The polyacrilic acids include homopolymers and copolymers of acrylate esters and acrylic acids.

A disadvantage of the use of such water-absorptive powders is that the powder can fall out of the cable during processing or cable reentry. Therefore, various means have been used to bind the powders to cable materials, including the use of adhesives or electrostatic fields to bind the powders to other cable elements. However, the adhesives reduce the surface area of the powder available to absorb moisture, and the electrostatic fields can dissipate over time.

Another way to introduce a superabsorbent powder into a cable is to include the powder on or in between layers of a tape or yarn which is either helically or longitudinally wrapped around the cable core. A disadvantage of the use of such tapes or yarns is their expense. Another is the space such tapes or yarns can take up within a cable, thereby increasing the cable outer diameter.

U.S. Pat. Nos. 4,913,517 and 5,389,442 disclose cables including fibrous strength members, made for example of aramid yarns such as Kevlar® yarns, which have been pretreated before cabling by being impregnated with a superabsorbent material derived from an aqueous solution. The aqueous solution comprises acrylate polymeric material including acrylic acid and sodium acrylate functionalities and water. However, the strength yarns must be impregnated and dried to provide a film in and around the interstices of the fibrous strength members, and later cabled in a separate processing step.

SUMMARY OF THE INVENTION

It is therefore an object of the present invention to provide telecommunication cables containing superabsorbent powders which are easily applied and do not involve the use of expensive tapes or yarns.

Another object of the invention is to avoid binding superabsorbent powders in such cables through the use of adhesives which decrease the surface area of the powder available for moisture absorbance.

These and other objects are provided, according to the present invention, by enlisting the aid of the enemy to be guarded against, namely water or another non-hydrophobic liquid, to serve to attach powder to cable components. A telecommunication cable according to the invention comprises at least one longitudinally extending telecommunication element, a substrate element having a surface, a layer comprising water-absorptive powder wetted in the region adjacent to the substrate element surface by a limited amount of non-hydrophobic fluid on the substrate element surface, and a longitudinally extending outer sheath surrounding the telecommunication element, substrate element, and said layer. The substrate element may be a longitudinally extending tube surrounding a longitudinally extending telecommunication element. Of course, the substrate element may be other cable components such as rod-like tensile strength members, slotted core rods, metallic or plastic tapes, or the telecommunication element itself.

Also disclosed is a method for providing such a telecommunications cable. The surface of the substrate element is wetted with a non-hydrophobic liquid such as water. The liquid may contain a surfactant to provide a more even coating of liquid on the substrate element surface. If desired, a more even coating may also be obtained through pretreating the substrate element surface prior to wetting with a corona, flame, or chemical bath. A preferred method of wetting is to apply the liquid by means of a mist applicator.

A quantity of water-absorptive powder is applied to the wetted substrate element surface, thereby forming a layer comprising wetted water-absorptive powder on the substrate element surface. It is found that the powder will adhere to the substrate element surface to a certain extent even though no adhesive material is used. Any loose nonwetted powder may optionally be removed by the application of a pressurized gas.

Another telecommunication cable provided according to the invention comprises a water-absorptive powder which is attached to the surface of a cable element through the use of a water soluble adhesive. Upon the entry of moisture into the cable, the adhesive is dissolved to a certain extent, thus exposing more of the surface area of the water-absorptive powder.

BRIEF DESCRIPTION OF THE DRAWINGS

The preferred embodiments of the invention are described in the several drawings, in which.

DETAILED DESCRIPTION OF THE INVENTION

The present invention will be described more fully hereinafter with reference to the accompanying drawings, in which one or more preferred embodiments of the invention are shown. This invention may, however, be embodied in many different forms and should not be construed as limited to the embodiments set forth herein; rather, these embodiments are provided so that the disclosure will fully convey the scope of the invention to those skilled in the art. Like numbers refer to like elements throughout. The drawings are not necessarily drawn to scale but are configured to clearly illustrate the invention.

Figure 1:
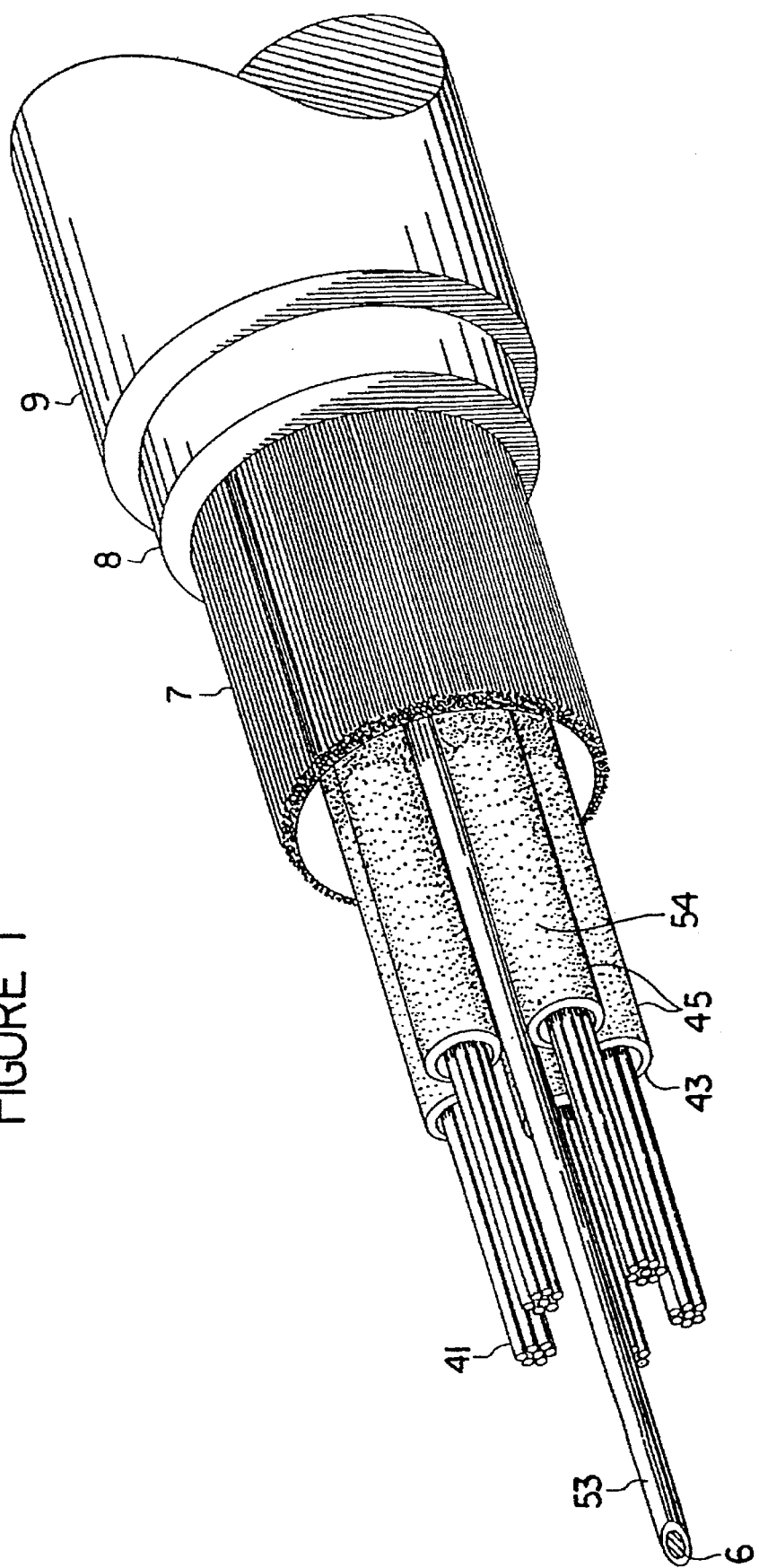
FIG. 1 is a perspective view of a cable comprising a water-soluble adhesive.

FIG. 1 shows a buffer tube type light waveguide cable according to a first embodiment of the invention. A central member 6 having a plastic coating 53 thereon is surrounded by thermoplastic buffer tubes 43. Buffer tubes 43 may be laid straight or stranded with a single direction of lay or with an alternating direction of lay. Contained in each buffer tube 43 is a plurality of light waveguides 41. Alternatively, light waveguide ribbons may be disposed in the buffer tubes. Buffer tubes 43 each have a coating of water soluble adhesive 54 in which a water absorptive powder 45 is embedded. Surrounding buffer tubes 43 is a layer of aramid yarns 7, an optional intermediate tube 8, and outer sheath 9. Intermediate tube 8 may be replaced or enclosed by tapes, welded metallic tubes, or strength members.

A first example of a water soluble adhesive 54 which may be used is Cycloflex 70-3757, a hot melt water soluble adhesive supplied by National Starch and Chemical Co. This adhesive has a softening point at 142° F. and a typical viscosity of 1300 cps at 350° F. and 2820 cps at 300° F. A second example is 2H246, a pressure sensitive hot melt adhesive supplied by Swift Adhesives. This adhesive has a softening point of around 150° F. and a typical viscosity ranging from 12,000 cps to 14,000 cps at 250° F. and from 5,000 cps to 8,000 cps at 275° F. See U.S. Pat. No. 4,743,238, incorporated herein by reference.

Water-soluble adhesives may be based on water-soluble polymers such as polyvinylalcohol, polyvinylpyrrolidones, hydroxypropyl cellulose, some polyamides, and vinylpyrrolidonevinyl acetate copolymers, including those supplied by GAF and BASF.

The cable of FIG. 1 may be made by conventional methods. Adhesive 54 may be applied by passing the formed tubes, or other substrate elements, through a spray of adhesive or by passing the substrate elements through applicator rollers. If a hot-melt adhesive is used, it is applied at an elevated temperature, and remains at an elevated temperature during powder application. Water absorptive powder 54 may be applied by passing the substrate elements through a conventional applicator in which the powder is blown onto the adhesive by compressed air.

Figure 2:
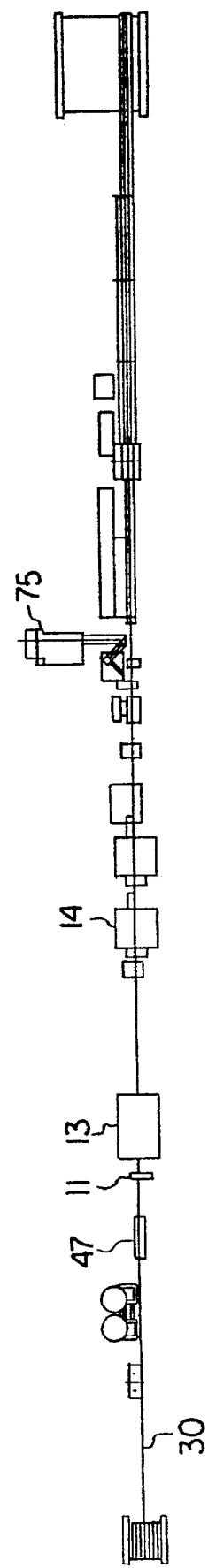
FIG. 2 is a schematic view of a jacketing line for making a cable according to the invention.

The jacketing line of FIG. 2 may be used to prepare a cable according to either the first embodiment of the invention or the second embodiment of the invention, which will be more fully described below. A cable core 30 comprising a central strength member 10 surrounded by buffer tubes 12 is drawn through an applicator 11. Applicator 11 may be selected so as to apply either a water soluble adhesive or a non-hydrophobic fluid such as water, as desired in the particular manufacturing line. The core then passes through a conventional powder dusting box 13. Dusting box 13 applies a water-absorptive powder 45 to the exterior surface of buffer tubes 12. The powdered core then proceeds through yarn spinners 14, and an extruder 75 forms an outer jacket over the powdered core.

Figure 3:
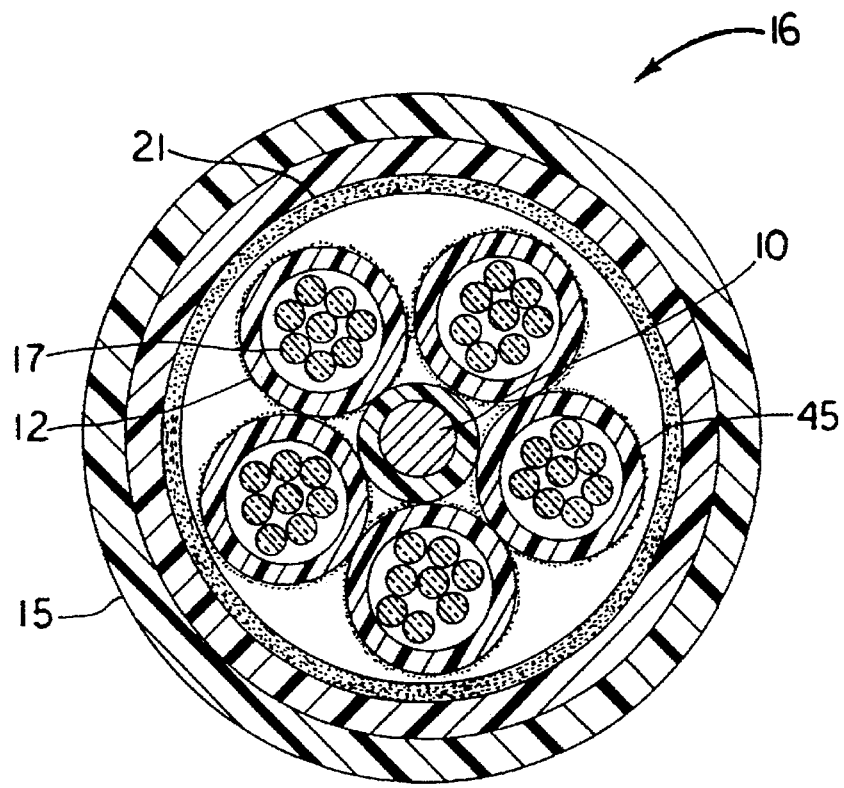
FIG. 3 is a cross-sectional view of a stranded cable core.
Figure 4:
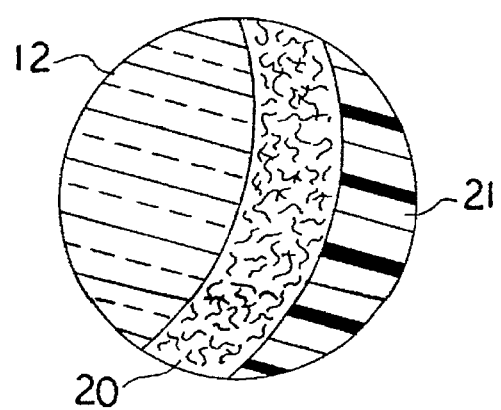
FIG. 4 is an enlarged sectional view of the cable of FIG. 3 of the substrate element surface and layer thereon comprising wetted powder; and, FIG. 5 is a cross-sectional view of a mist applicator.

A cable 16 according to the second embodiment of the invention is shown in FIG. 3. Cable 16 comprises central strength member 10 surrounded by longitudinally extending buffer tubes 12 each holding longitudinally extending telecommunication elements such as optical fibers 17. A water-swellable yarn may be disposed adjacent to strength member 10. As shown in FIG. 4, the exterior surface of a buffer tube 12 is coated by a layer 20 comprising water-absorptive powder 45 which is wetted by water. A binder tape 21 having water-absorptive powder on its exterior surface is applied over the powdered tubes 12 and dual layer outer jacket 15 surrounds the powdered core.

Of course, a layer 20 may be applied to the exterior of other cable elements, such as jacketed strength member 10.

Mist applicator 11, best seen in FIG. 5, includes a ring plate 22 having a plurality of nozzles 23 mounted thereon. A fluid such as water is supplied under pressure to mist applicator 11. In the mist applicator shown, four nozzles 23 are mounted such that each is spaced apart from adjacent nozzles by 90 degrees to ensure complete coverage of the exterior surface of the cable element 24 which is to be wetted.

An experiment was conducted to determine the effect on water penetration caused by changes in processing speed and the application of a vacuum to remove excess swellable powder. In the experiment, five polyethylene rods were stranded about a central member. A water swellable yarn was placed adjacent to the central member. A Mistic Mist mist generator having four nozzle heads was used to place a water mist on the stranded core. A Chalkmaster powder application machine was then used to coat the wetted core with blown fine powdered water swellable material. The Chalkmaster machine includes an assembly utilizing a pressurized air input which may be turned off or on to remove excess powder. Tests were conducted at a line speed of either ten or twenty meters per minute and with the powder removal assembly on or off. The jacketed test samples were then cut and measured for water penetration before aging according to Bellcore TA-20, Issue 9, 6.6.7. The five individual measurements from each run were averaged to obtain the water penetration lengths shown in Table I below.

TABLE I

| Average Length of water penetration in cm | | |
| --- | --- | --- |
| Line Speed, meters per minute | Air wiper off | Air wiper on |
| 10 | 18 | 49.4 |
| 20 | 34.2 | 65.6 |

The results demonstrated that a faster line speed and the use of the air wiper vacuum tend to reduce the effectiveness of the water absorptive powder. However, a faster line speed tends to reduce production costs, and the air wiper vacuum removes excess powder in the cable. Whether to use the air wiper, and the speed of the manufacturing line, should be decided based on the requirements for the particular cable being constructed.

Either an anionic or nonionic surfactant may be mixed with the water to be applied to the substrate element to reduce the surface tension of the water to permit better wetting. Examples of surfactants include Triton from Union Carbide and Surfynol from Air Products.

Polyolefins have among the lowest surface energy, also known as surface tension, of any known materials. Particularly if the substrate element is a polyolefin, the substrate element may be pretreated prior to application of the liquid. Such pretreatments include corona, plasma, flame, and chemical treatments. A chamber 47 may be used to pretreat the core with an energy field.

A substrate element may be given a corona pretreatment by application of a high voltage field to ionize oxygen around the substrate element. Radio-frequency radiation may be applied to the gas around the substrate to create a cold gas plasma at low gas pressure. Either pretreatment increases the surface energy of the substrate element. Less preferred pretreatments involve the application of flame or a chemical bath to the substrate element.

It is to be understood that the invention is not limited to the exact details of the construction, operation, exact materials, or embodiments shown and described, as modifications and equivalents will be apparent to one skill art without departing from the scope of the invention.

What is claimed is:

1. A method for inserting a water-absorptive powder into a cable containing a longitudinally extending telecommunication element, comprising:

providing a longitudinally extending telecommunication element;

providing a longitudinally extending substrate element having a surface;

wetting said surface of the substrate element with a non-hydrophobic liquid;

applying water-absorptive powder to said wetted substrate element surface, thereby forming a layer comprising wetted water-absorptive powder on said substrate element surface; and, forming an outer sheath around said telecommunication element and said substrate element surface and said layer.

2. A method as set out in claim 1, further comprising removing at least a substantial amount of any loose non-wetted water-absorptive powder prior to forming the outer sheath.

3. A method as set out in claim 2, wherein said substantial amount of any loose nonwetted powder is removed by applying pressurized gas to the substrate element.

4. A method as set out in claim 1, wherein said water-absorptive powder is applied by passing said substrate element through a chamber in which powder is blown onto said wetted substrate element surface.

5. A method as set out in claim 1, wherein said substrate element is wetted by application of a mist.

6. A method as set out in claim 1, wherein said surface is wetted with a fluid containing a surfactant.

7. A method as set out in claim 1, wherein said surface is treated with an energy field prior to wetting.

8. A method as set out in claim 1, wherein said non-hydrophobic fluid comprises water.

9. A telecommunication cable, comprising:

at least one longitudinally extending telecommunication element;

a substrate element having a surface;

a layer comprising water-absorptive powder wetted by a non-hydrophobic fluid applied during manufacture of said cable on said substrate element surface; and, an outer sheath containing the telecommunication element, substrate element, and said layer.

10. A telecommunication cable as recited in claim 9, wherein the substrate element is a tube containing a longitudinally extending telecommunication member.

11. A telecommunication cable, comprising a telecommunication element, a water-absorptive material adhered to a surface of a substrate element by a water-soluble adhesive material, and a longitudinally extending outer sheath surrounding said telecommunication element, water-absorptive material, and substrate element.

12. A telecommunication cable as recited in claim 11, wherein the substrate element is a tube containing a longitudinally extending telecommunication member.

13. A telecommunication cable as recited in claim 11, wherein said water-soluble adhesive material is based on a polymer selected from the group consisting of polyvinylalcohol, polyvinylpyrrolidone, hydroxypropyl cellulose, polyamides, and vinylpyrrolidonevinyl acetate copolymers.

* * * * *